Patented Feb. 11, 1930

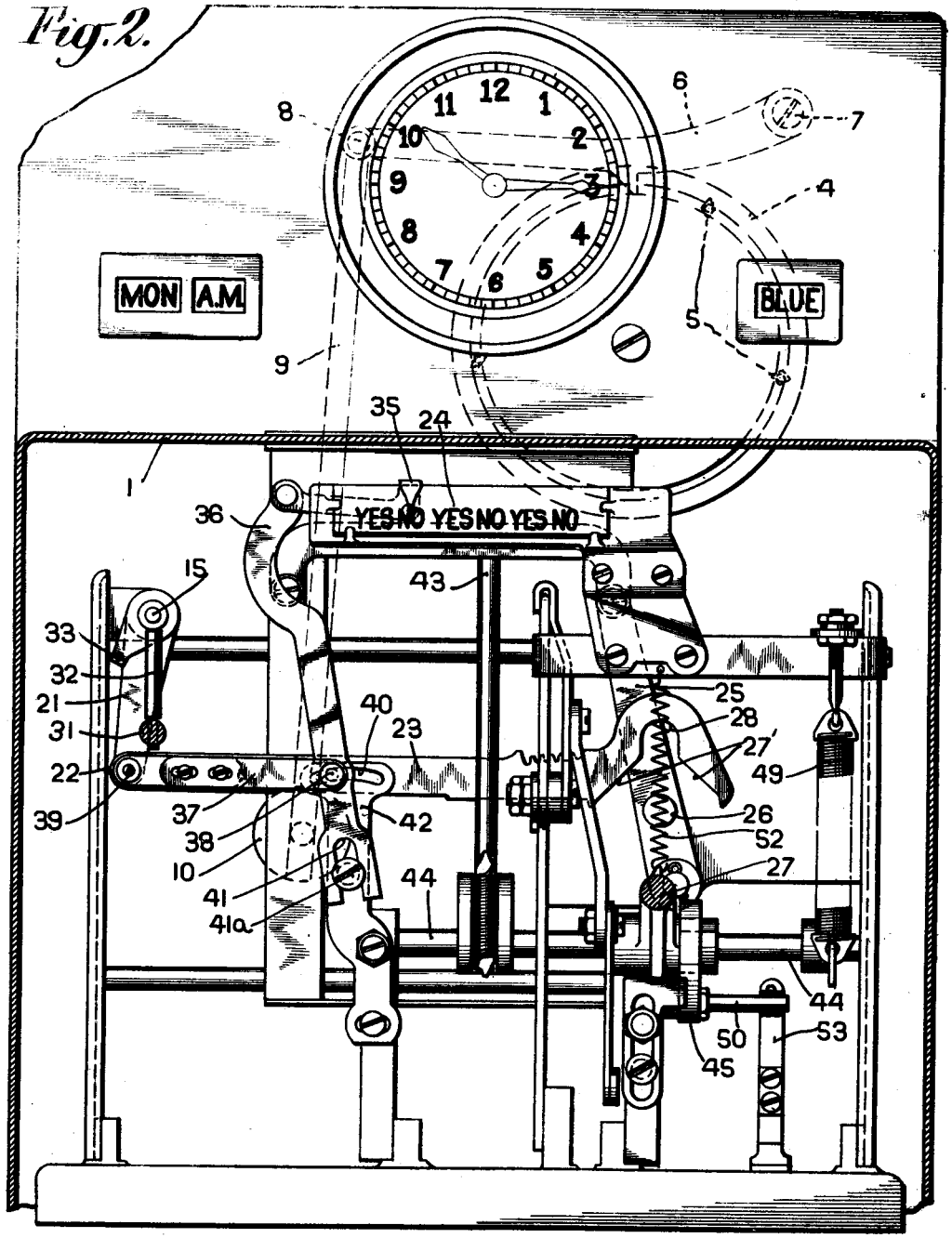

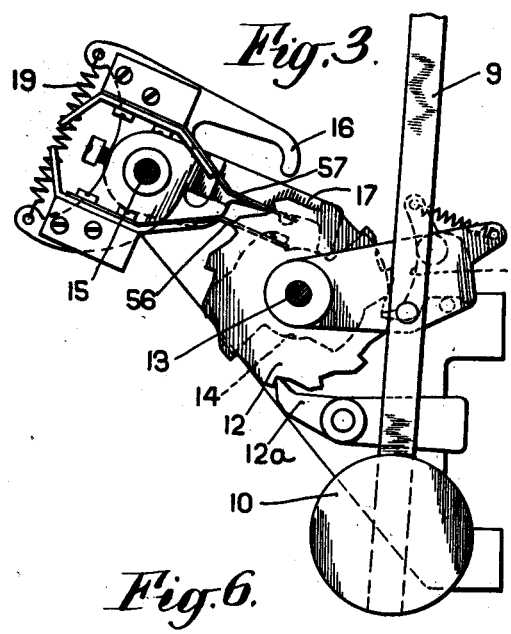
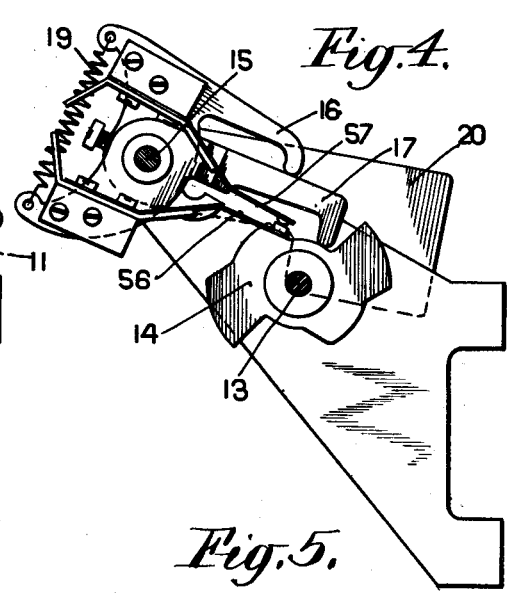
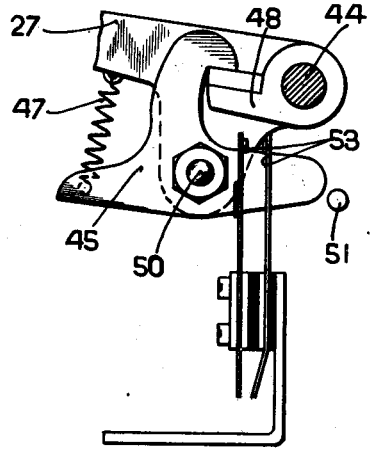
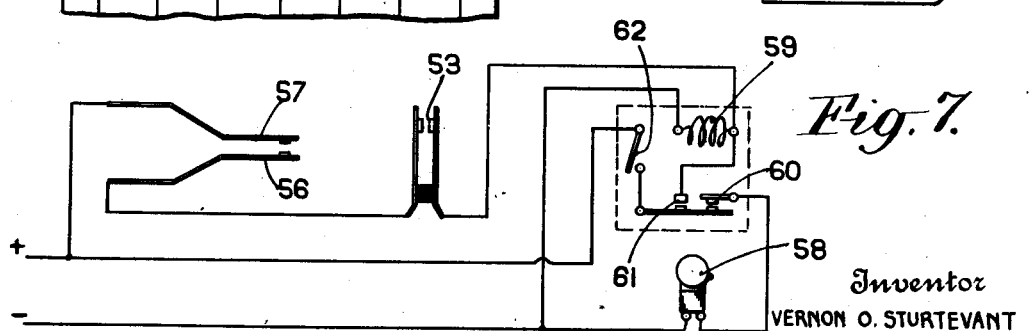

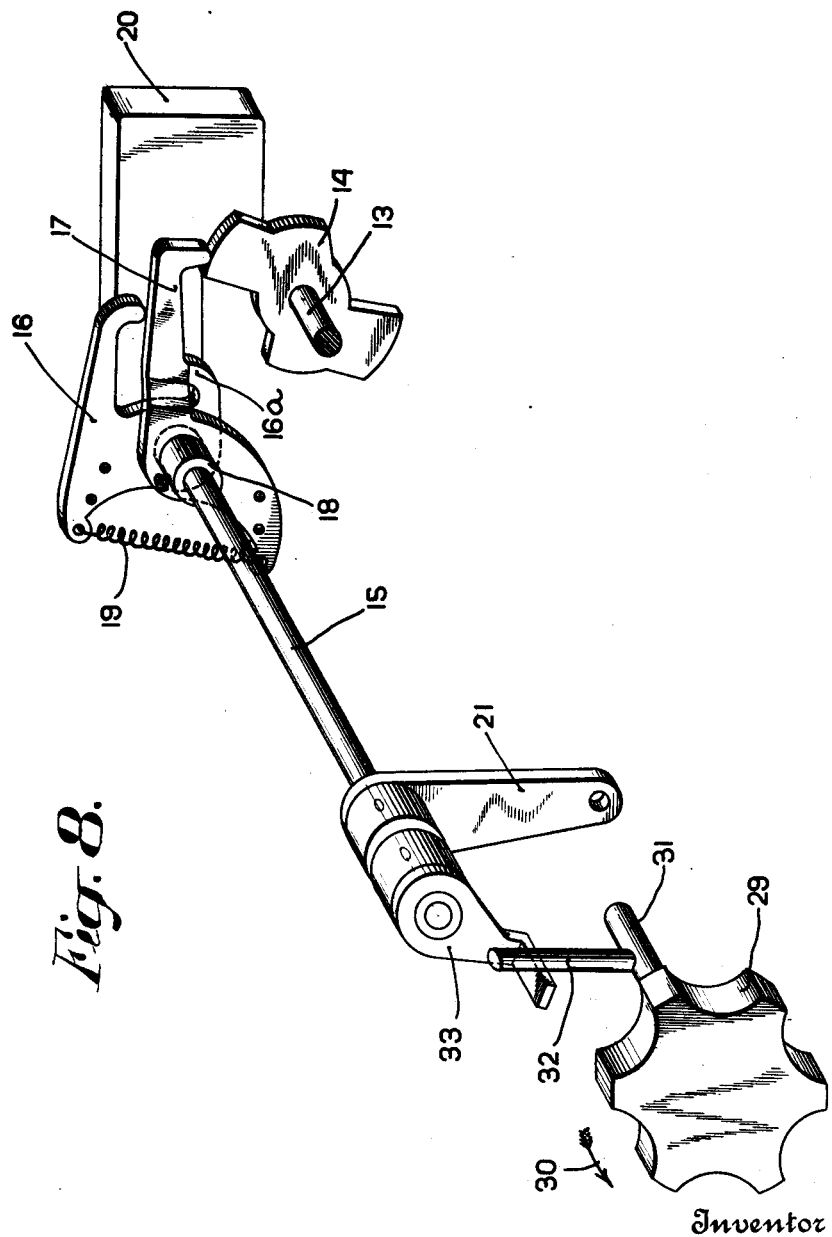

1,747,021

UNITED STATES PATENT OFFICE

VERNON O. STURTEVANT, OF ENDICOTT, NEW YORK, ASSIGNOR TO INTERNATIONAL TIME RECORDING COMPANY OF NEW YORK, OF ENDICOTT, NEW YORK, A CORPORATION OF NEW YORK

COMBINED ACCIDENT AND TIME RECORDER

Application filed December 22, 1926. Serial No. 156,359.

This invention concerns a time registering device and more particularly a device in the nature of a time clock on which employees may register the time of entering a business institution and the time which they leave it.

The principal object of my invention is to provide a time registering device by which data of an arbitrary nature may be recorded in connection with a time record in addition to the usual "in and out" indications usually provided for in such devices.

Another object is to provide a time registering device by which data of an arbitrary nature may be recorded by manually shifting the record on which the time is recorded.

Another object is to provide a time registering device by which data of an arbitrary nature may be recorded in conjunction with time registration by manually effecting relative shifting of the registering mechanism and the record sheet on which the record is made.

A further object is to provide a time clock in which "in and out" designations are effected by automatic relative shifting of the registering mechanism and the record to indicate the facts in different record columns and further provided with means for effecting manual shifting of the parts to indicate additional data by the entry of the time record in predetermined record columns not used for any of the automatic designations of the mechanism.

A still further object is to provide means whereby a bell or other signal will automatically function when a registration is made by an injured employee.

These and other objects of my invention will be hereinafter pointed out in the accompanying specification and claims and shown in the drawings which show by way of illustration what I consider to be the preferred embodiment of my invention.

The preferred form of my invention provides a time clock to furnish as evidence printed records of injured employees in factories and other similar institutions and at the same time insure administration of immediate medical attendance, thereby eliminating the possibility of compensation being granted to an employee for injuries received other than while performing his duties. My device or "accident recorder" is to be situated near or next to the well known time recorder for registering of "in and out" indications. The device is built similarly to the usual time recorder but the "in and out" cams are modified to select only out positions i. e., the indicator is tripped far enough to skip the usual in column on the standard time card. In this manner the recorder will automatically upon depressing of the handle print a record in the out column on the card; a record in this column being arbitrarily selected to indicate lack of an injury to the operator during the preceding time period. Provision is made for the manual shifting to the in column should an employee become injured. When the recorder is manually shifted to the in column on the card, a pair of contacts are closed, which contacts are in series with another pair fastened to the base of the recorder and closed by a pin protruding from the operating handle, which in turn energizes a relay and causes an alarm to be rung. When the manual shift knob is released the bell continues to ring until an attendant reaches the recorder and resets the relay manually at which time he gives attention to the person injured and also makes out the required medical report. The record printed on the card consists of the date, hour and minute, same being printed on the card with a one color ribbon of a hue other than the standard red or blue, to insure registration being taken on proper recorder. Upon leaving the factory at night after registering on the in and out recorder, the employees instead of placing their cards in the out column rack, insert them into the accident recorder, the front or face of the card to be printed facing the recorder, or in other words the front of the card will contain information to be registered on the accident recorder and the back of the card information pertaining to time of entering and leaving the factory.

In the accompanying drawings forming part of this specification a practical embodiment of my invention is disclosed but as such illustration is primarily for purposes of disclosure it will be understood that my recorder may be modified in various respects without departure from the broad scope of my invention as hereinafter defined and claimed.

The accompanying drawings illustrate the preferred embodiment of my invention.

Fig. 2 is a front sectional view taken on line 2—2 of Fig. 1.

Figs. 3 and 4 are detail views of the cam and cam follower incorporated in my recorder.

Fig. 5 is a detail view of the hammer operating mechanism.

Fig. 6 is a front view of the card used in my recorder.

Fig. 7 is a circuit diagram showing an electrical indicator associated with my time recorder.

Fig. 8 is an isometric detail illustrating the method of setting the carriage moving mechanism.

Figure 1:
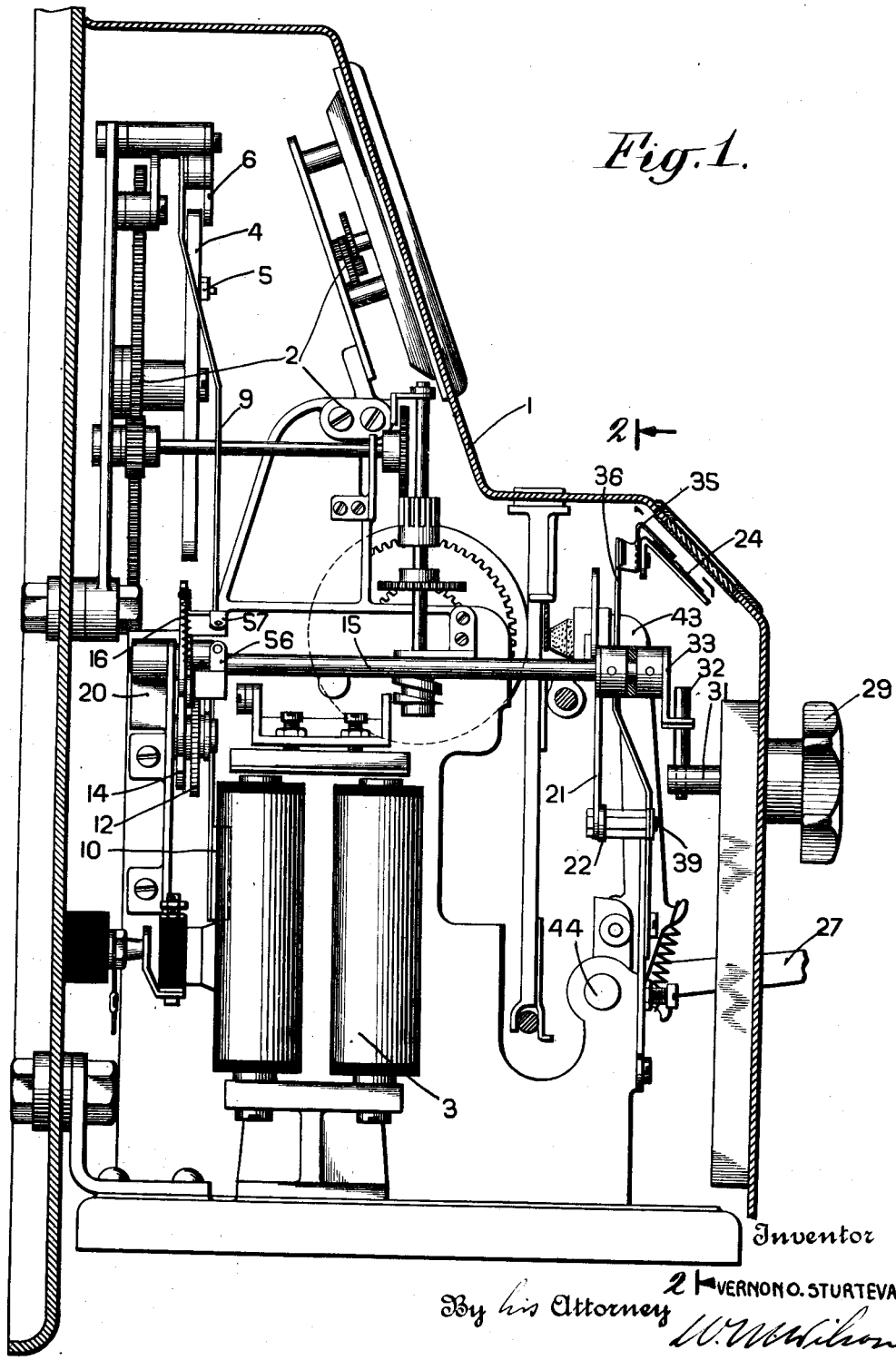
Fig. 1 is a side sectional view of my recorder.

Referring more particularly to the drawings in which is shown a time recorder of the standard type with certain modifications in and additions thereto to permit of an accident record being made conjointly with a check out time record. In the standard time recorder, provision is made for the automatic selecting of the different in and out columns on the card, whereas in my invention the automatic selection of the "out" columns only is effected in columns being used for time records designating an injury to the operator. Manual shifting means are provided for the selecting of the in or injury columns. Fig. 1 discloses my device as comprising a frame or casing 1, clock mechanism 2, drawing magnets 3 and a program wheel 4. At certain timed intervals the program wheel 4, by means of space pins 5, raises a lever 6 which is pivoted at 7. Pivotally connected to the free end of lever 6 at 8 is a link 9, carrying a weight 10 (see Fig. 2). After each elevation of the weight 10, upon its return to normal position through the medium of a stepping pawl 11 effects rotation (see Fig. 3) of a ratchet wheel 12 fast on a stud shaft 13, ratchet wheel moving one step for each downward movement of link 9, said ratchet being held by means of retaining pawl 12ª fixed to the frame of the recorder. Integral with ratchet wheel 12 is a cam 14 (see Figs. 3 and 4) which cam is positioned in accordance with the time on the face of the clock by means of the aforementioned ratchet wheel 12. A shaft 15 (see Fig. 8) is automatically positioned in accordance with cam 14 by means of a stop member having arms 16 and 16ª positioned one below the other, and cam arm 17 (see Figs. 4 and 8). The stop member is fixed on shaft 15, cam arm 17 being loosely mounted on the hub or bushing 18, of the stop member pinned to shaft 15. Resiliently holding cam arm 17 against the lower arm 16ª is a spring 19. On one end of the shaft 15 is a weight 20 tending to rotate same and holding cam follower 17 against cam 14 thus positioning the shaft in accordance with the time indication on the clock. Affixed to the shaft is an arm 21 (see Figs. 2 and 8) to which is pivoted at 22 a locating bar 23 (see Fig. 2) which through the medium of the mechanism just described is always positioned to automatically select a predetermined time card column for each time period. The card carrier 24 for receiving time cards for registering is suitably guided for lateral movement and may be shifted to different positions by a lever 25. This lever carries a pin 26 located beneath the end of the locating bar 23. Actuation of the operating lever 27 depresses the free end of the locating bar 23 and the pin 26 coacting with cam surfaces 27' will be forced into a slot 28 thus positioning the carriage to conform to the position of the locating bar unless its position already so conforms. The mechanism thus far described is commonly employed in time recording devices. According to the present invention instead of the cam 14 selecting both the in and out positions on the card, it only selects the out positions, the in steps on the cam being omitted. It is obvious, therefore, that the carriage selects the different out columns on the card and as the equipment is standard the carriage skips a card column between each two adjacent "out" columns. These skipped columns are used for the recording of an injury, which column may be manually selected by turning knob 29 (see Figs. 1 and 8) in the direction indicated by arrow 30. The knob 29 has a shank 31 from which laterally extends a pin 32. On rotation of the knob, pin 32 engages arm 33 rigidly affixed to shaft 15 and rotates the latter with the assistance of weight 20 until upper stop arm 16 rests on cam arm 17 (see Fig. 4) tensioning the spring 19 so that when the knob 29 is released the parts will automatically return to normal position as indicated in Fig. 3. This manual shifting of shaft 15 positions locating bar 23 to select the nearest intermediate card column (to indicate yes) when the bar is depressed by operation of knob 27. As will be noted in Fig. 8 rotation of the knob in a counterclockwise direction only will be effective in rotating the shaft 15 as when the handle 29 is rotated clockwise the pin 32 moves freely encountering no operating mechanism so that the locating bar 23 cannot be moved ahead to the next yes column. This limits a yes indication to a single column at any given time. The reason for this will appear later in connection with the description of the alarm feature.

Fixed to the cam follower 17 and on the upper stop 16 are a pair of contacts 56 and 57 respectively (see Figs. 3 and 4) which in the normal automatically selected positions of the shaft 15 are opened as indicated in Fig. 3. When the shaft 15 is manually shifted causing the cam follower to engage the upper stop arm 16 these contacts are closed as indicated in Fig. 4. The purpose of these contacts will be explained later.

The position of locating bar 23 is indicated at all times by a pointer 35 (see Fig. 2) which is pivoted to a lever 36 pivoted to an arm 37 at 38, which in turn is fulcrumed at 39 to the arm 21 (see Figs. 1 and 2). The arm 36 is guided by means of an arcuate slot 40 in a bracket 42 coacting with a fixed pin on the lever 36. The lever 36 is provided with a slot 41 to form a sliding fulcrum with pin 41ª on bracket 42. This construction is well known and needs no detail description.

The operation of printing a record in a selected card column is effected by means of a printing hammer 43 (see Fig. 1) fixed on a shaft 44 (see Figs. 1 and 5). The operating lever 27 is loosely pivoted on shaft 44 and carries a tripping dog 45 normally forced by a spring 47 to engage a latching surface on member 48 which member is rigidly fixed on shaft 44. When lever 27 is depressed for printing a record it rotates shaft 44 through the coaction of tripping dog 45 engaging the latching surface of member 48 retracting printing hammer 43 (see Fig. 1) and tensioning hammer spring 49 (see Fig. 2). When operating lever 27 approaches the limit of its downward stroke tripping dog 45 encounters a stud 51 fixed to the frame of the recorder and is rocked against the action of spring 47, thereby releasing member 48, permitting hammer spring 49 (see Fig. 2) to rotate the shaft 44, throwing the hammer 43 to position for effecting printing. Incidentally a stud 50 on tripping dog 45 encounters contacts 53, thereby forcing them into engagement. Upon release of the operating lever 27 it is returned to upper normal position by means of spring 52 (see Fig. 2) permitting tripping dog 45 to reengage the surface of member 48.

It is obvious that in a recorder of this kind some provision must be made to insure proper medical attention for the injured employee. I have provided a pair of contacts 56 and 57 fixed on cam stop 16 and cam follower 17 which are in series with a set of contacts 53 fixed to the frame of the recorder. When an injured employee makes a registration he manually shifts the mechanism to the yes or injured column by means of knob 29 as heretofore described. This operation closes contacts 56 and 57 and when lever 27 is depressed a stud 50 fixed on tripping pawl 45 encounters contact 53 thereby closing the circuit and causing an alarm to function. Referring now to Fig. 7 as a matter of illustration I have used as an alarm a bell 58 but it is obvious that any other signalling device may be incorporated. This bell 58 is controlled by a relay 59 which in turn is controlled by contacts 53 closed by operating lever 27 and contacts 56 and 57 mounted on cam stop 16 and cam follower 17, (see Figs. 3 and 4). As heretofore described as long as the shaft 15 positions the card carriage automatically through cam 14 for registering in the no or uninjured column on the card contacts 56 and 57 as disclosed in Fig. 3 are open but when the shaft is manually shifted by means of knob 29 to select a yes or injured column on the card the contacts are closed as in Fig. 4. When the operating lever 27 is depressed to make the registration contacts 53 are closed as heretofore described by means of stud 50 fixed on tripping pawl 45 thereby closing the circuit and energizing relay 59, closing the relay contacts 60 and 61. Relay contacts 60 close the bell circuit and relay contacts 61 establish a holding circuit governing relay 59 thereby effecting continuous ringing of the bell until the circuit is manually opened through a manually operated switch 62 by the physician or attendant administering medical aid. This bell 58 is situated in the physician's or attendant's office and the manual switch 62 is situated in or near the accident recorder to insure of the proper medical attention so that the physician in charge must go out to the time clock and throw the switch before the bell stops ringing. With this method it is obvious that an injured person will receive proper medical attendance.

While I have shown and described and pointed out the fundamental novel features of the invention as applied to a single modification it will be understood that various omissions and substitutions and changes in the form and details of the device illustrated and in its operation may be made by those skilled in the art without departing from the spirit of the invention. I intend to be limited therefore only as indicated by the scope of the following claims.

I claim—

1. A time recorder comprising means for automatically selecting one of a plurality of registering positions, said means comprising a cam and a cam follower coacting therewith and means for shifting to a predetermined registering position from each of the automatically selected positions, said latter means including a movable stop coacting with said cam follower for limiting the shifting movement from an automatically selected position.

2. A time recorder comprising means for automatically selecting one of a plurality of registering positions, said means including a cam and a cam follower coacting therewith and means for shifting to a different predetermined alternative registering position from each of said automatically selected positions, said means including a limiting member cooperating with said cam follower and movable therewith and including a stop portion normally out of contact with said cam follower and coacting with said cam follower upon the shifting to a predetermined alternative position from an automatically selected position so as to limit the shifting to said alternative position.

3. In a time recorder including printing means and means for holding a record sheet in position for receiving an imprint from said printing means, means for shifting said printing means and holding means relatively a predetermined amount and means for at will shifting said printing means and holding means relatively a different invariable predetermined amount.

4. In a time recorder including printing means and means for holding a card in position for receiving an imprint from said printing means, means for automatically shifting said printing and holding means relatively a predetermined amount, means for manually shifting said printing and holding means relatively a different predetermined amount and means for limiting said manual shifting movement to said predetermined amount.

5. In a time recorder including printing means and means for holding a record sheet in position for receiving an imprint from said printing means, means for shifting said printing means and holding means relatively a predetermined amount and means for shifting said printing means and holding means relatively a different predetermined amount, said latter shifting means being effective to shift said printing and holding means relatively in one direction only.

6. In a time recorder including a printing device and means for holding a record card in position to receive an imprint from said printing device, means for shifting said printing device and holding means relatively a predetermined amount and means for shifting said printing device and holding means an amount less than said predetermined step.

7. In a time recorder including a printing device and means for holding a record sheet in position for receiving an imprint from said printing device, means for normally shifting said printing device and holding means relatively a predetermined plurality of equal steps in succession and means for shifting said printing device and holding means relatively an amount different from said previously mentioned amount in one direction only.

8. In a time recorder including a printing device and means for holding a record sheet in position for receiving an imprint from said printing device, means for automatically shifting said printing device and holding means relatively a predetermined amount and means for manually shifting at will said printing device and holding means relatively a different amount in one direction only.

9. In a time recorder including timing mechanism, a printing device, and means for holding a record card in position for receiving an imprint from said printing device, means for shifting said printing device and holding means relatively under control of said timing device and means for shifting said printing device and holding means relatively under manual control in a predetermined direction, said manually controlled shifting means being ineffective for shifting the printing device and holding means relatively in other than said predetermined direction.

10. In a time recorder including a printing device and means for positioning a record card in position for receiving an imprint from said printing device, means for shifting said printing device and holding means relatively a predetermined amount, and means for shifting said printing device and holding means relatively a second different amount, said latter shifting means including an element cooperating with said first-named shifting means to limit said second different predetermined amount of shifting movement.

11. In a time recorder including timing mechanism, a printing device, and means for holding a record card in printing position, a cam controlled by said timing mechanism, a cam follower coacting with said cam, means operated by said cam through said cam follower for shifting said holding means and printing device relatively a predetermined amount and means for shifting said holding means and printing device a different amount controlled by said cam follower.

12. In a time recorder including timing mechanism, a printing device and record sheet holding means, a cam controlled by said timing mechanism for shifting said holding means and printing device relatively to permit registrations to be made by said printing device in normal predetermined positions of said record sheet and means for shifting said printing device and holding means relatively in one direction only to permit registrations to be made in positions of said record card different than said normal positions.

13. In a time recorder including printing means and means for holding a record card in position for receiving an imprint from said printing means, a shifting mechanism for moving said card holder and printing means relatively to successively position alternate columns on the record card in position for receiving an imprint and means for shifting said card holder and printing means relatively to position said card for receiving an imprint in space between said alternate columns.

14. A device of the kind described in claim 13, said latter shifting means being effective to shift said card holder and printing means relatively in one direction and ineffective to shift said holder and printing means in any other direction.

15. In a time recorder, a record card shifting mechanism comprising a time-controlled cam, a cam follower coacting therewith, an element normally movable with said cam follower, a card holder the position of which is determined by said element, means for moving said element relatively to said cam follower, and means for limiting the movement of said element relative to said cam follower.

16. A time recorder having a record carrier and cooperating printing mechanism with means for automatically moving said carrier and mechanism relatively for a plurality of successive steps in the same direction to select non-adjacent columns on a record for registering, means for at will shifting said carrier and mechanism relatively from an automatically selected column, and means for limiting any movement of said latter shifting means to a predetermined invariable amount.

In testimony whereof I hereto affix my signature.

VERNON O. STURTEVANT.